Figure 1:
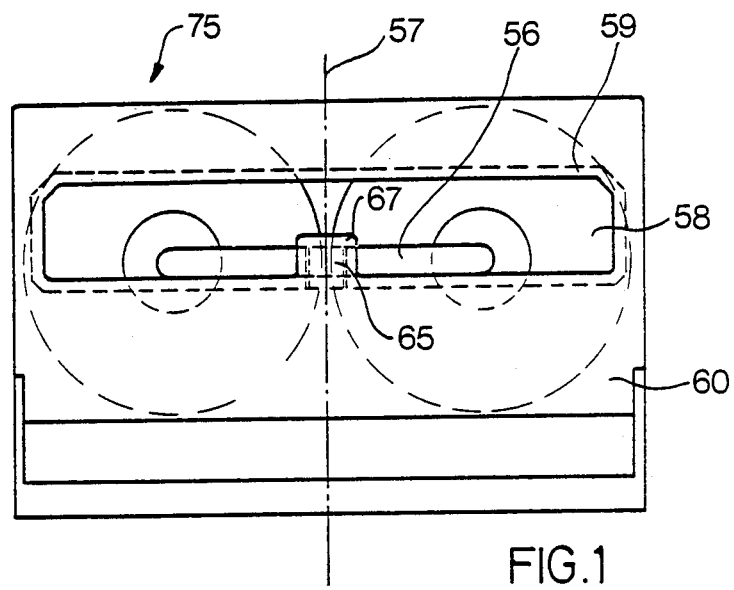

United States Patent [19]

Schoettle et al.

[11] Patent Number: 4,717,091
[45] Date of Patent: Jan. 5, 1988

[54] TAPE CASSETTE, IN PARTICULAR A VIDEO TAPE CASSETTE, AND A PRESSURE SPRING THEREFOR

[75] Inventors: Klaus Schoettle, Heidelberg; Paul Deigner, Kehl; Herbert Dietze, Berghaupten; Volker Frank, Heidelberg; Oswald Waidele, Mahlberg, all of Fed. Rep. of Germany

[73] Assignee: BASF Aktiengesellschaft, Ludwigshafen, Fed. Rep. of Germany

[21] Appl. No.: 680,164

[22] Filed: Dec. 10, 1984

[30] Foreign Application Priority Data

Dec. 9, 1983 [DE] Fed. Rep. of Germany ... 8335294[U]

[51] Int. Cl.$^4$ .......................... G03B 1/04; G11B 15/32
[52] U.S. Cl. ..................................... 242/199; 360/132; 267/52; 267/158
[58] Field of Search .................. 242/192, 197–200; 360/96.3, 132, 137; 267/158, 52; 200/283, 246

[56] References Cited

U.S. PATENT DOCUMENTS

| | | | |
|---|---|---|---|
| 3,632,909 | 1/1972 | Rowley | 200/283 X |
| 4,368,860 | 1/1983 | Goto | 242/199 |
| 4,449,676 | 5/1984 | Ogata et al. | 242/198 |
| 4,496,118 | 1/1985 | Oishi et al. | 242/198 |
| 4,500,050 | 2/1985 | Oishi et al. | 242/198 |

FOREIGN PATENT DOCUMENTS 0060497 9/1982 European Pat. Off. .
2090812 7/1982 United Kingdom .

*Primary Examiner*—John M. Jillions
*Attorney, Agent, or Firm*—Keil and Weinkauf

[57] ABSTRACT

A transparent window member for a tape cassette, which together with a reel pressure spring, forms a subassembly of the cassette. The reel pressure spring has a U-shaped central portion, the bight of the U being parallel to the plane of the spring arms, and the reel pressure spring having a longitudinal edge with two transverse slits spaced the same as the legs of the U of the central portion of the pressure spring. The central portion may thus be transversely inserted in the longitudinal edge of the window member and it thus forms a locating element for the pressure spring.

9 Claims, 10 Drawing Figures

TAPE CASSETTE, IN PARTICULAR A VIDEO TAPE CASSETTE, AND A PRESSURE SPRING THEREFOR

This invention relates to a pressure spring for a tape cassette, in particular a video tape cassette, the pressure spring being of the kind intended to be fastened to a tape cassette housing for exerting a spring force on one or more tape reels in the direction of a defined operating position, and which is produced from a metal strip. The invention also relates to a tape cassette with at least one transparent window and to a window for such a tape cassette.

Pressure springs of the kind referred to, which are sometimes known as reel pressure springs, are intended for use in all known commercially available video cassettes of the VHS and Beta video systems, as well as for a novel, 8 mm video cassette. In all these types of cassette, coplanar reels are housed in upper and lower cassette housing halves. A curved spring, punched from spring metal sheet, is fastened inside the upper half of the housing and presses the coplanar reels towards the lower half of the housing. Hence, when such a cassette is placed in an appropriate recording/playback apparatus, the reels lie evenly on the hub holders of the apparatus and run smoothly when the tape is transported. All such reel pressure springs have the same function, but their size and, if necessary, their spring force may differ depending on the size of the particular cassette, the size of the cassette reels and the spacing apart of the cassette reels. Conventionally pressure springs of the kind referred to are usually manufactured by punching them out of spring metal strip using a special, but expensive, die. Advantageously the punching is controlled to minimise wastage of material and to enable a rapid punching sequence. However wastage of the spring metal strip material does occur due, on the one hand, to the punching technique, for example when edge strips are required for transporting the spring steel strip past the die, and on the other hand, to the shape of the pressure spring being stamped, for example when inner cutouts are required, as in the conventional diamond-shaped spring for the VHS cassette. To reduce the loss of material as a result of spring shape, DE-AI-No. 3,148,080, EP-AI-No. 0,060,497 and U.S. Pat. No. AI-4,368,860 have proposed other embodiments of reel pressure springs. Although these suggestions result in a desirable saving of material, they too have the disadvantage that a special die is required for each type of spring.

It is an object of the present invention to overcome the disadvantages associated with conventional pressure springs of the kind referred to and to provide pressure springs of the kind referred to which can be manufactured and fastened in an economical manner We have found that this object is achieved, in accordance with the invention, if the spring has approximately the same width as the metal strip and has substantially parallel longitudinal edges, and fastening means are provided in the central region of the spring, said fastening means projecting from the plane of the spring in its central region.

The pressure spring provided in this manner can be produced with virtually no loss of metallic material.

In practical embodiments of a spring according to the invention, the locating means may be of channel or U-bend shape, may comprise locating wings or may comprise inner or outer flaps which have been cut and bent upwards.

In a novel tape cassette, in particular a video tape cassette, which has a housing and one or more transparent windows and in which a pressure spring which exerts a spring force on at least one tape reel is fastened to the housing, the spring is manufactured from a metal strip, has substantially parallel longitudinal edges and is provided in the central region with fastening means, which project from the plane of the spring in its central region.

The resulting tape cassette can be manufactured in an advantageous manner and can possess any of the claimed locating means for the pressure spring. Moreover, it is advantageous if, in a tape cassette with a central window section, the spring is fastened directly in holding means of the window section. In a tape cassette of this type which is advantageous in practice, the window section possesses, as a holding means for the spring, two slits spaced apart the same distance as limbs (or side walls) of the U-bend of a pressure spring, and a recess which extends between the slits and whose depth is about the same as, or greater than, the thickness of the spring.

Figure 2:
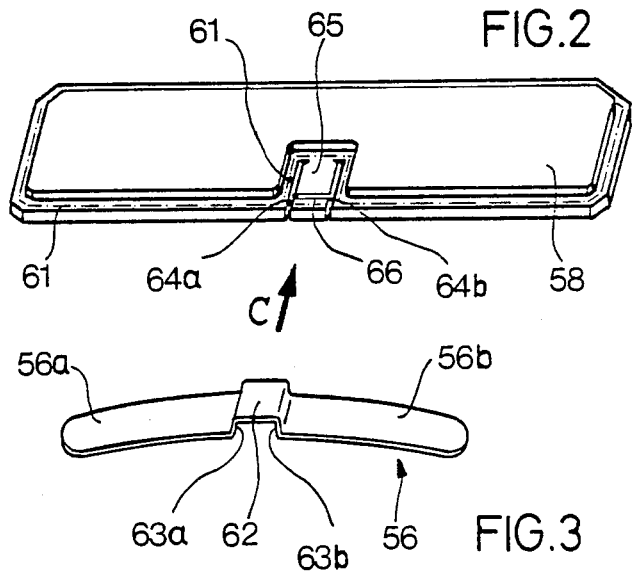
Figure 3:
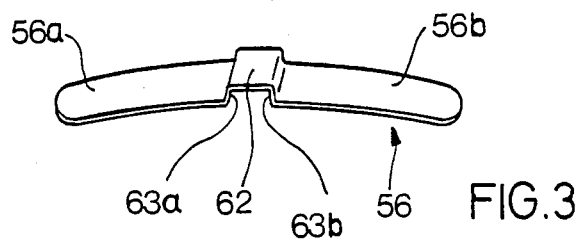
Figure 4:
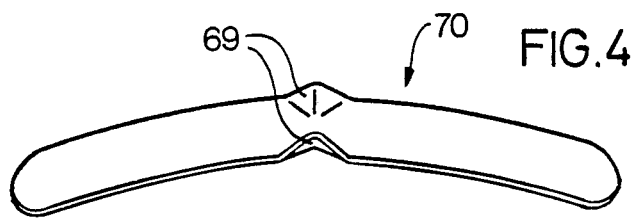
Figure 5:
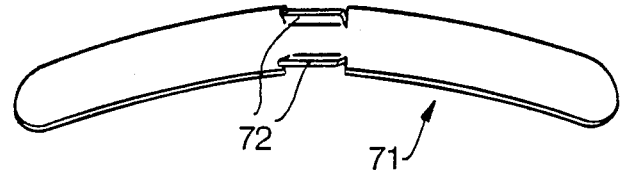
Figure 7:
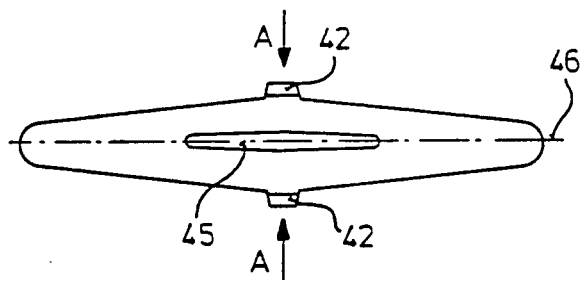
Figure 6:
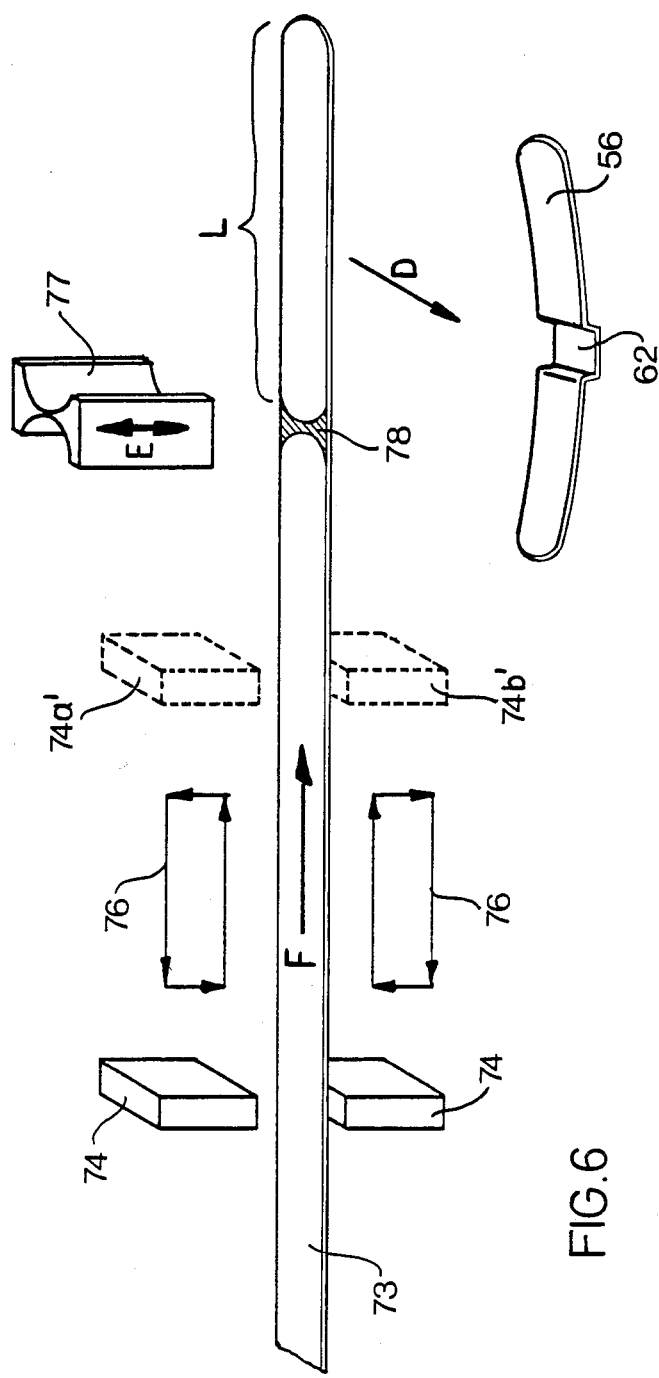
Figure 8:
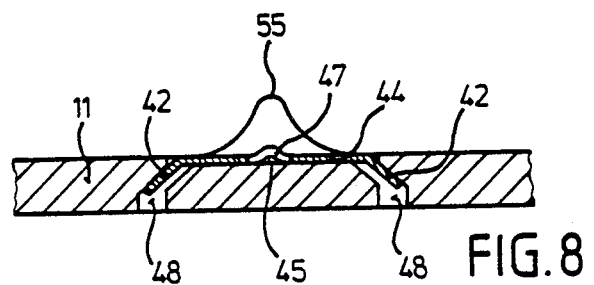
Figure 9:
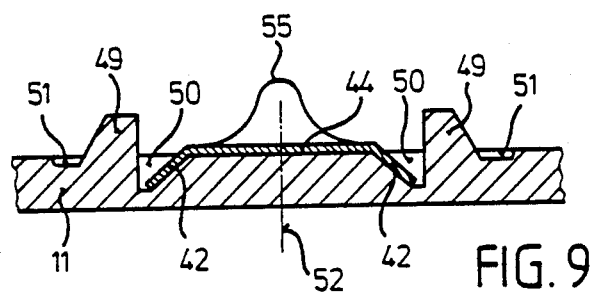
Figure 10:
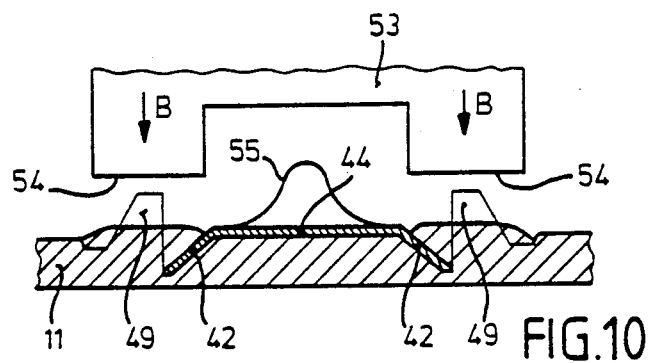

Embodiments of the invention will now be described, by way of example, with reference to the accompanying drawings, in which FIG. 1 shows a plan of a cassette according to one aspect of the invention and in particular an 8 mm video cassette with a window, a reel spring and reels, FIG. 2 shows the window of the cassette shown in FIG. 1 having a recess for holding a pressure spring according to another aspect of the invention, FIG. 3 shows one embodiment of a pressure spring with a U-bend for fastening to the cassette window shown in FIGS. 1 and 2, FIG. 4 shows another embodiment of a pressure spring according to the invention and formed with two angular locating wings, FIG. 5 shows a further embodiment of a pressure spring according to the invention and possessing inner flaps, FIG. 6 shows a scheme for manufacturing the spring shown in FIG. 3, FIG. 7 shows a yet further embodiment of a pressure spring according to the invention and possessing outer flaps, and FIGS. 8–10 show fastening schemes for the spring shown in FIG. 7.

FIG. 1 is a diagram of a VHS video cassette 75 having a cassette housing 60, video tape reels 67 and 68 and a narrow, strip-like pressure spring 56, according to the invention, which is fastened to the cassette housing 60 in the region of a transverse central axis 57 of the cassette. This axis 57 also constitutes the axis of symmetry for all cassette components. An approximately rectangular, transparent window 58 is arranged inside a contour edge 59 of the cassette housing 60 and is welded thereto by means of an energy edge forming the peripheral edge 61 of the window 58. The window 58 is shown more clearly in FIG. 2 and has formed midway along one of its longitudinal edges a holding or fastening means. The holding or fastening means enables the spring 56 and window 58 to be assembled before the assembled unit is subsequently welded.

As can be seen in FIG. 3, the spring 56 is manufactured with a central channel or U-bend 62, which can be produced before, during or after a punching process.

The limbs of the U-bend are designated 63a and 63b, and their length depends on the thickness of the window 58.

The spring 56 is easily mounted by positioning the limbs 63a and 63b of the U-bend 62 in slits 64a and 64b formed in a longitudinal edge of the window 56, the slits 64a, 64b being spaced apart the same distance as the limbs 63a and 63b. The slits 64a and 64b are advantageously formed in a window recess 65 opening into one of the faces of the window. Thus, the intermediate part between the slits 64a and 64b is also recessed and substantially rectangular in shape, the depth of this recess being not less than the thickness of the spring. It is advantageous with regard to the manufacturing process if the thickness of the intermediate part is chosen to be the same as that of the peripheral edge 61.

After ther spring 56 has been interengaged with the window holding or fastening means, with the base of the U-bend 62 upwards, and the window 58 has subsequently been welded by means of its energy edge, the window 58 and spring 56 are so fastened to the housing 60 that they cannot be parted and therefore no separate welding process is required for fastening the spring 56. The inserted spring 56 lies, as shown in FIG. 1, with the base of the U-bend upwards and with the spring arms 56a and 56b below the window 58, giving a spatially advantageous unit and permitting low production and assembly costs. It is advantageous if the front part of the base of the recess 65 is in the form of a raised rib 66 (see FIG. 2) having the thickness of the peripheral edge 61, in order to provide an edge to prevent the inserted spring 56 from falling out before the preassembled unit has been welded. In FIGS. 2 and 3, the reference letter C designates the direction of assembly of spring 56 and window 58.

It is quite possible for the spring 56 to have the base of its U-bend 62 exposed on the outside of the cassette housing, but it is also possible, and preferable from the point of view of design, to cover the spring 56, as described in detail below. As stated above, the welding energy edge, which consists of an arching of the peripheral edge 61 (cf. the dot-dash line in FIG. 2), continues in the region of the window recess 65. The overlying upper part of the housing 60 can possess, on the inside, a projection 67 which fits into the recess 65 and completely covers this recess and therefore the spring 56, and hence supports them reliably in the vertical direction. When the window 58 on which the spring 56 has been mounted beforehand is welded with the upper part of the housing 60 along the entire energy edge, even in the region of the recess 65, the spring 56 is fastened securely in housing 60, and in a predetermined position with respect to the position of the reels 67 and 68, without further measures being required.

Further examples of springs and fastening means according to the invention are described below. FIG. 4 shows a spring 70 formed from an elongate metallic strip and having embossed locating wings 69 (sometimes referred to hereinafter as embossings) arranged in a central region of the spring. The locating wings 69 run from a longitudinal central axis of the spring outwardly to the longitudinal edges of the spring. The locating wings 69 are approximately semi-pyramidal in shape. Compared with the springs described below, spring 70 has the advantage that, because shaping is used to form locating wings instead of incisions, the spring 70 is not weakened.

FIG. 5 shows another spring 71 with inner flaps 72 formed in a central region, each of which flaps are produced by making two incisions and bending the flaps 72 away from the general plane of the spring.

FIG. 7 shows another spring 44 having a central elongate, e.g. oval, cutout 45 and locating means in the form of outer flaps 42, which may form, for example, a cutout of a different spring during the spring manufacture. For yet more secure welding, the outer flaps 42 can also possess lateral lugs. In order to effect fastening, the flaps 42 are, as shown in FIG. 8, bent downward at the sides through an angle, typically of from 30°-60° C., by bending forces in the directions of arrows A, with the result that the spring 44 can arch 47 along a central line 46. The cassette housing 11 has holes 48 which match the flaps 42. In order to effect fastening, the spring 44 is arched to enable insertion of the flaps 42 into the holes 48. The spring 44 is then released so that it returns to its unarched condition and automatically becomes anchored in the housing 11, without further fastening being necessary (cf. FIG. 8).

In another embodiment, the housing 11 possesses fastening projections 49 (see FIG. 9) and depressions 50 and 51 on its inner wall in the region of the flaps 42 of the spring 44. The depressions 50 are adjusted to the angle of the flaps 42, in the direction of the central axis 52. After the spring 44 has been inserted into the depressions 50 without the application of any bending forces to arch the spring, the flaps 42 are completely surrounded by plastic material of the housing 11, as shown in FIG. 10, and are hence fixed with the aid of a die 53. The die 53 can, for example, be an ultrasonic sonotrode which is moved in the direction of arrows B and has an end face 54 which plastifies the material. However, it is also possible to employ thermoplastic welding or other fastening techniques. In each of FIGS. 8 to 10, reference numeral 55 designates one of the spring ends bent upward.

Novel springs 56, 70, 71 and 44, which have been described must of course possess dimensions corresponding to the particular spring force and length of the conventional springs in video cassettes. This ensures that the reels 67 and 68 are pressed downward onto the base wall over the full radial extent of their area of motion inside the cassette 75.

FIG. 6 shows a scheme for the manufacture of the spring 56 shown in FIG. 3 from metallic strip material, the width of the metallic strip material 73 corresponding to that of the spring 56.

The metallic, e.g. spring steel, strip material 73 is drawn by two gripping means 74a and 74b. These gripping means move along courses 76 for moving the strip material from a first position, through the length L of the extended spring, to a second position, along the direction indicated by arrow F. The end of the spring steel strip material 73 which projects beyond the plane of the cutting die 77 is then detached, a small amount of intermediate waste material 78 being produced in the case of rounded spring ends, as shown in the figure. However, where a straight separating cut is employed, which is also possible, no waste at all is produced. Hence, compared with conventional springs, the novel spring 56 can be produced using a simpler and therefore cheaper die and with virtually no loss.

The U-bend 62 can be introduced subsequently, as indicated by arrow D, using a bending tool.

The directions of movement of the die 77 are designated by E. The other springs 70, 71 and 44 can be manufactured in similar manner, except that the fastening elements are appropriately formed, i.e. produced in each case by means of an appropriate manufacturing procedure, e.g. shaping, bending or cutting, as indicated by arrow D.

All of the springs 56, 70, 71 and 44 which have been described can be fastened to plastic components, such as housing 60 or 11 or window 58, by means of welding processes.

In addition to the above embodiments of springs and methods of fastening in cassettes, many other equally advantageous springs and fastening means are possible. The shape with which the most material is saved is the strip shape, and the strip may furthermore be S-shaped or corrugated. The most advantageous method of fastening comprises purely mechanical mounting on the housing or window, for example by snapping in or wedging, in which case an additional fastening process, for example by welding, adhesive bonding, etc., is advantageously dispensed with.

Each of the springs 44, 56, 70 and 71 described herein is formed from an elongate metallic strip and has fastening means provided in the central region of the spring. The central region of each spring is suitably shaped to provide fastening or locating means at least part of which project from the plane of the spring in its central region.

We claim:

1. A tape cassette having a housing with a top and a bottom, a pair of tape reels and a reel pressure spring attachable to said top for urging said reels in the direction of the bottom of the housing,
   said reel pressure spring having two arms extending from a central portion of the spring, which portion projects away from the plane of the spring arms and is in the shape of a U having a bite portion parallel to said plane and two upstanding leg portions, and the top of said housing comprising
   a holding means for said reel pressure spring, said holding means being in the form of a transparent window member and having a longitudinal edge with two transversely extending slits therein, said slits having a mutual spacing the same as that of the legs of the U-shaped central portion of the spring,
   so that said central portion of the reel pressure spring, which forms a locating means, may be transversely inserted into the longitudinal edge of said transparent window member, said window member and the spring upon insertion therein forming a subassembly.

2. A tape cassette as claimed in claim 1, wherein said window member has between said slits a recessed ledge portion upon which said bite portion rests upon insertion of the central portion of said spring.

3. A transparent window member for a tape cassette having a housing with a top to which said window member is attachable, a bottom, a pair of tape reels and a reel pressure spring mountable on said window member for urging said reels in the direction of the bottom of the housing, said reel pressure spring having two arms extending from a central portion of the spring which portion projects away from the plane of the spring arms and is in the shape of a U having a bite portion parallel to said plane and two upstanding leg portions,
   said window member having a longitudinal edge with two transversely extending slits therein, said slits having a mutual spacing the same as that of the legs of the U-shaped central portion of the spring,
   so that said central portion of the reel pressure spring, which forms a locating means, may be transversely inserted into the longitudinal edge of said window member, said window member and said reel pressure spring upon insertion into the window member forming together a subassembly of said tape cassette.

4. A window member as claimed in claim 3, wherein said window member has between said slits a recessed ledge portion upon which said bite portion rests upon insertion of the central portion of said spring, the window member and the spring upon insertion forming a subassembly.

5. A window member as claimed in claim 4, wherein said ledge portion is recessed from the upper face of said window member by an amount the same as or greater than the thickness of said bite portion of the spring.

6. A window member as claimed in claim 4, wherein said window member has a welding edge for welding said subassembly to the housing top.

7. A window member as claimed in claim 6, wherein said welding edge, in the area of said recessed ledge portion, extends closely around the major part of the contour of said ledge portion so as to insure that the reel pressure spring in the area of its central portion is tightly clamped against the housing top.

8. A window member as claimed in claim 6, wherein along the outer edge of said recessed ledge portion a raised rib is formed to prevent the spring from falling out prior to the welding of the subassembly to the housing top.

9. A transparent-window-member/reel-pressure-spring subassembly for a tape cassette having a housing with a top to which said window member is attachable, a bottom and a pair of tape reels, said reel pressure spring being mountable on said window member for urging said reels in the direction of the bottom of the housing, said reel pressure spring having two arms extending from a central portion of the spring which portion projects away from the plane of the spring arms and is in the shape of a U having a bite portion parallel to said plane and two upstanding leg portions,
   said window member having a longitudinal edge with two transversely extending slits therein, said slits having a mutual spacing the same as that of the legs of the U-shaped central portion of the spring,
   so that said central portion of the reel pressure spring, which forms a locating means, may be transversely inserted into the longitudinal edge of said window member to for said subassembly.

* * * * *